United States Patent [19]

O'Hern

[11] 4,187,935

[45] Feb. 12, 1980

[54] BRAKE OPERATED SHIFT LOCK

[76] Inventor: Thomas R. O'Hern, 714 Glenridge Dr., West Palm Beach, Fla. 33405

[21] Appl. No.: 882,276

[22] Filed: Feb. 28, 1978

[51] Int. Cl.[2] ........................ G05G 5/10; B60K 29/02

[52] U.S. Cl. .................................... 192/4 A; 180/271; 74/483 R

[58] Field of Search ............ 192/4 A, 3 T; 74/483 R, 74/483 K; 180/82 A

[56] References Cited

U.S. PATENT DOCUMENTS

| | | | |
|---|---|---|---|
| 2,467,485 | 4/1949 | Krieg | 192/3 T |
| 2,875,640 | 3/1959 | Huso | 192/4 A X |
| 3,942,614 | 3/1976 | Thompson | 192/4 A |
| 3,994,183 | 11/1976 | Markl | 180/82 A X |

*Primary Examiner*—Benjamin Wyche
*Attorney, Agent, or Firm*—Clarence A. O'Brien; Harvey B. Jacobson

[57] ABSTRACT

A gear selector lock structure is provided and is operative to unlock the gear selector of a vehicle against movement from the non-drive position to the drive position thereof when the lock structure is in the locked position. The lock structure is spring biased toward the locked position and an electric solenoid is operatively associated with the gear lock structure for shifting the latter from the locked position to the unlocked position when the solenoid is electrically actuated. The solenoid is electrically connected to the brake light circuit of the associated vehicle and is, therefore, actuated when the brake pedal of the vehicle is moved from the brake release position to the brake applied position. The gear selector of the associated vehicle and the lock structure include coacting structure whereby the gear selector may cam the lock structure from the locked position thereof to the unlocked position and thereafter release the lock structure for movement to the locked position upon movement of the gear selector from the drive position to the non-drive position in which the gear selector is locked until such time as the brake pedal of the associated vehicle is depressed to activate the solenoid and thereby cause the lock structure to be shifted from the locked position to the unlocked position thereof.

6 Claims, 3 Drawing Figures

BRAKE OPERATED SHIFT LOCK

BACKGROUND OF THE INVENTION

In many instances automatic transmission equipped vehicles have a tendency to jump forward or rearward when placed in forward or reverse gear after they are initially started due to the fact that the engines powering such vehicles operate under "fast idle" conditions when initially started. Although an alert driver may quickly apply the brakes of the vehicle, should it jump either forward or rearward upon being initially placed in gear while the engine is operating under a "fast idle" condition, the vehicle may jump a foot or two, or possibly more, before the brakes can be applied by the driver. While this is not necessarily a dangerous condition, it is possible that a child, adult or pet animal could be disposed closely to the rear or front of the vehicle and be accidentally struck thereby before the driver of the vehicle can apply the brakes after initially placing the transmission in gear. Accordingly, a need exists for a gear shift lever lockout structure operative to prevent the gear shift lever of an automatic transmission equipped car from being shifted from a non-drive position to a drive position until such time as the foot brake of the vehicle is applied.

Various other forms of transmission lockout controls have been heretofore provided. However, most of these previously known structures are not readily mountable on existing vehicles as after market accessories therefor.

Examples of various forms of gear selector locking mechanisms including some of the general structural and operational features of the instant invention are disclosed in U.S. Pat. Nos. 2,875,640, 2,890,581, 3,780,839 and 3,942,614.

BRIEF DESCRIPTION OF THE INVENTION

The shift lever control of the instant invention is constructed in a manner whereby it may be readily mounted on an existing vehicle fire wall in operative association with the automatic transmission gear shift lever and the control needs only a single electrical connection between the control and the brake light circuit of the associated vehicle to be rendered wholly operative in conjunction with the vehicle. In addition, the control is constructed in a manner whereby it may be rendered inoperative whenever desired merely by manually shifting a latch from an inoperative position to an operative position.

The main object of this invention is to provide a gear shift lever control whereby the gear shift lever of a vehicle may not be shifted from a non-drive position to a drive position without the foot brake of the associated vehicle being applied.

Another object of this invention is to provide a gear shift lever control which may be readily mounted on existing vehicles as after market accessories therefor.

Still another object of this invention is to provide a gear shift lever control which may be readily rendered inoperative merely by the shifting of a latch portion thereof from an inoperative position to an operative position.

Another important object of this invention is to provide a gear shift lever control which may be readily incorporated into the manufacture of new automobiles.

A final object of this invention to be specifically enumerated herein is to provide a gear shift lever control in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part thereof, wherein like numerals refer to like parts throughout.

DETAILED DESCRIPTION OF THE INVENTION

Figures 1, 2, 3:
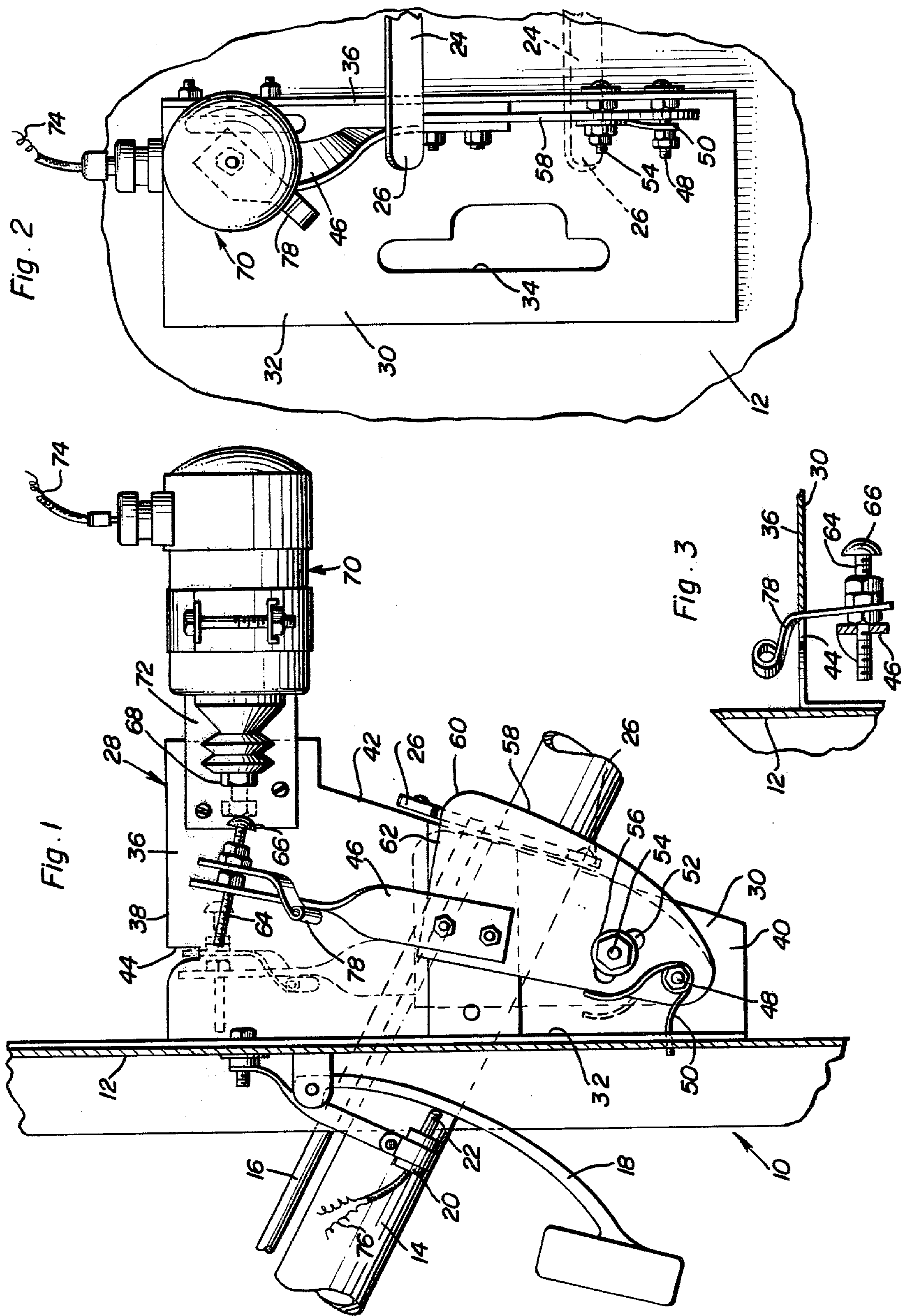
FIG. 1 is a fragmentary, vertical, sectional view of the fire wall portion of a conventional form of motor vehicle equipped with an automatic transmission and with the shift lever control of the instant invention operatively associated with the shift lever of the vehicle.
FIG. 2 is an elevational view of the assemblage illustrated in FIG. 1 as seen from the right side thereof; and, FIG. 3 is a fragmentary, horizontal, sectional view illustrating the manner in which the manually shiftable latch of the shift lever control may be actuated to deactivate the shift lever control.

Referring now more specifically to the drawings, the numeral 10 generally designates a conventional form of vehicle fragmentarily illustrated in FIG. 1 and including a fire wall 12, a steering column 14, an oscillatable gear selector shaft 16 extending downwardly along the steering column 14, a suspended brake pedal 18 and a normally closed brake light actuating switch 20 supported from the fire wall 12 in operative association with the brake pedal 18 and engaged by the latter to shift the operator 22 of the switch 20 to a position with the switch in an open position.

The lower end of the gear selector shaft 16 includes a generally radially extending arm 24 operatively connected to suitable automatic transmission shift linkage (not shown) of the vehicle 10 and the arm 24 includes a free end portion 26 and is swingable about the center axis of the shaft 16 upon angular oscillation of the latter between non-drive and drive positions of the gear selector shaft 16. The brake pedal 18 is spring biased rearwardly to a position engaging the operator 22 of the switch 20 to open the latter.

The control of the instant invention is referred to in general by the reference numeral 28 and includes an L-shaped mounting bracket 30 including a first flange 32 provided with a slot 34 in which to receive fasteners (not shown) secured through the fire wall 12 and the flange 32 in order to secure the latter to the fire wall. The bracket 30 includes a second flange 36 including upper and lower marginal edges 38 and 40 and an inclined forward edge portion 42 disposed at generally 90 degrees relative to the steering column 14 and gear selector shaft 16. The upper marginal edge 38 of the flange 36 is notched as at 44 and a cam lever 46 is pivotally supported from the flange 36 as at 48 and is spring biased toward a position with the upper end of the lever 46 swung forwardly away from the fire wall by means of a butterfly spring 50. The lower portion of the lever 46 is slotted as at 52 and a fastener 54 is secured through the flange 36 and the slot 52 and has a guide washer 56 thereon for loosely engaging the side of the lever 46 remote from the flange 36 against which the remote side of the lever 46 bears.

The lower portion of the lever 46 includes a cam surface 58 including a rearwardly curving upper end 60 merging smoothly into an upwardly facing stop surface 62 on the lever 46.

The upper end of the lever 46 has a fastener 64 secured therethrough and the fastener 64 includes a head 66 on its forward end which opposes a head 68 carried by the armature of an electric solenoid referred to in general by the reference numeral 70 and supported from the flange 36 by means of a mounting bracket 72. The solenoid 70 is grounded relative to the vehicle 10 through the mounting bracket 72 and the mounting bracket 30. The solenoid 70 includes an insulated conductor 74 electrically connected thereto and the conductor 74 is electrically connected to the brake light circuit 76 in which the switch 20 is serially connected.

The fastener 64 is secured through the free end of the lever 46 and has a latch arm 78 pivotally mounted thereon and releasably engageable in the notch 44.

Referring now more specifically to FIG. 2 of the drawings, the solid line position of the arm 26 designates the non-drive "park" position of the gear selector shaft 16. The phantom line position of the arm 24 in FIG. 2 designates the "drive" position of the gear selector shaft 16. The gear selector shaft 16 may also be movable to "2nd" and "low" positions spaced below the "drive" position illustrated in FIG. 2.

When the arm 24 is in the "park" position illustrated in solid lines in FIGS. 1 and 2, the gear selector shaft 16 may not be rotated to swing the arm 24 downwardly toward the "drive" position illustrated in phantom lines in FIGS. 1 and 2 inasmuch as the free end of the arm abuts the stop surface 62. However, upon depression of the brake pedal 18, the switch 20 will be closed and the solenoid 70 will be actuated whereby the spring biased armature thereof will be shifted to the left, as viewed in FIG. 1, in order to engage the head 66 of the fastener 64 and swing the lever 46 from the solid line position of FIG. 1 to the phantom line position of FIG. 1 whereupon the stop surface 62 will be swung out of alignment with the path of movement of the arm 24 along the marginal edge 42 and the arm 26 may be swung downwardly to the "drive" position thereof illustrated in phantom lines in FIGS. 1 and 2. Of course, most vehicles include "reverse" and "neutral" positions intermediate the "park" and "drive" positions.

Of course, once the arm 24 has been swung downwardly from the "park" position illustrated in solid line in FIG. 1 and the brake pedal 18 is released, the solenoid 70 will be deactivated and the lever 46 will tend to return toward the solid line position thereof illustrated in FIG. 1. However, if the arm 24 is in any of the various positions thereof between the "park" and "drive" positions, the full movement of the lever 46 toward the solid line position thereof in FIG. 1 will be prevented by engagement of the cam surface 58 with the arm 26. Therefore, the arm 24 may be readily shifted between all of the gear positions below the "park" position.

If the arm 26 is disposed in the "2nd" or "low" positions below the "drive" position, upward swinging movement of the arm 24 into engagement with the cam surface 58 will cause the lever 46 to swing rearwardly (to the left) from the solid line position illustrated in FIG. 1 toward the phantom line position of FIG. 1. However, once the arm 24 has been swung upwardly beyond the stop surface 62, the lever 46 may swing fully to the solid line position thereof illustrated in FIG. 1 under the biasing action of the spring 50 to lock the arm 24 against downward movement until such time as the brake pedal 18 is depressed.

If it is desired, the control 28 may be deactivated by manually retracting the lever 46 against the spring 50 and swinging the latch 78 from the position thereof illustrated in FIG. 1 to the applied position thereof illustrated in FIG. 3 with the latch 78 seated in the notch 44. In this position, the latch 78 retains the lever 46 in the phantom line position thereof illustrated in FIG. 1. of the drawings and the arm 24 may be swung freely between the various positions thereof independent of depression of the brake pedal 18 and resultant actuation of the solenoid 70.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be restored to, falling within the scope of the invention.

What is claimed as new is as follows:

1. In combination with a vehicle including a steering column and gear selector means mounted on said column for movement between a non-drive position and a forward drive position, wheel brake operating means shiftable between brake applied and brake release positions, brake light operating electrical circuit means for actuating a brake light when closed and terminating operation of said brake light when open, means operatively connecting said wheel brake operating means and said electrical circuit means for closing the latter upon shifting of said wheel brake operating means from said brake release position toward said brake applied position, gear selector movement lock means shiftable between locked and unlocked positions and operative to lock and unlock said gear selector means against movement from said non-drive position to said forward drive position when in said locked and unlocked positions, respectively, and lock means shifting means operative to shift said lock means to said unlocked position and locked position in response to said circuit means being closed and opened, respectively, said lock means shifting means including means yieldingly biasing said lock means to said locked position and solenoid means operative to shift said lock means from said locked position to said unlocked position, latch means operative, independent of said lock means shifting means, for manually releasably latching said lock means in said unlocked position thereof, said gear selector means and said lock means including coacting means operative to cam said lock means from said locked position to said unlocked position and thereafter release said lock means for movement to said locked position upon movement of said gear selector means from said forward drive position to said non-drive position.

2. The combination of claim 1 wherein said lock means shifting means includes means yieldingly biasing said lock means to said locked position and solenoid means operative to shift said lock means from said locked position to said unlocked position.

3. The combination of claim 1 wherein said vehicle includes a fire wall through which said steering column extends, said gear selector movement lock means being disposed on the engine side of said fire wall.

4. The combination of claim 3 including a mounting bracket mounted on the engine side of said fire wall, said gear selector lock means being shiftably supported from said mounting bracket.

5. In combination with a vehicle including a steering column and gear selector means mounted on said column for movement between a non-drive position and a forward drive position, wheel brake operating shiftable between brake applied and brake release positions, brake light operating electrical circuit means for actuating a brake light when closed and terminating operation of said brake light when open, means operatively connecting said wheel brake operating means and said electrical circuit means for closing the latter upon shifting of said wheel brake operating means from said brake release position toward said brake applied position, gear selector movement lock means shiftable between locked and unlocked positions and operative to lock and unlock said gear selector means against movement from said non-drive position to said forward drive position when in said locked and unlocked positions, respectively, lock means shifting means operative to shift said lock means to said unlocked position and locked position in response to said circuit means being closed and opened, respectively, said vehicle including a fire wall through which said steering column extends, said gear selector movement lock means being disposed on the engine side of said fire wall, a mounting bracket mounted on the engine side of said fire wall, said gear selector lock means being shiftably supported from said mounting bracket, said lock means shifting means including means yieldingly biasing said lock means to said locked position and solenoid means operative to shift said lock means from said locked position to said unlocked position, latch means operative, independent of said lock means shifting means, for manually releasably latching said lock means in said unlocked position thereof, said latch means being supported from said lock means and releasably engageable with said bracket to lock said lock means in said unlocked position.

6. The combination of claim 5 wherein said solenoid means is supported from said mounting bracket.

* * * * *